US008534743B2

(12) United States Patent
Scheler

(10) Patent No.: US 8,534,743 B2
(45) Date of Patent: Sep. 17, 2013

(54) METHOD FOR OPERATING A HATCH ARRANGEMENT OF A MOTOR VEHICLE

(75) Inventor: Alexander Scheler, Bamberg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 57 days.

(21) Appl. No.: 13/331,674

(22) Filed: Dec. 20, 2011

(65) Prior Publication Data

US 2012/0151840 A1 Jun. 21, 2012

(30) Foreign Application Priority Data

Dec. 20, 2010 (DE) ......................... 10 2010 054 975

(51) Int. Cl.
*B60J 5/02* (2006.01)

(52) U.S. Cl.
USPC ....................................................... 296/146.8

(58) Field of Classification Search
USPC ................ 296/146.8, 106, 216.02, 76, 146.4; 105/377.11; 292/201, 256.5, 336.3, 216; 114/201 R, 203
See application file for complete search history.

(56) References Cited

U.S. PATENT DOCUMENTS

| | | | | |
|---|---|---|---|---|
| 5,531,498 | A * | 7/1996 | Kowall | 296/146.4 |
| 6,092,336 | A * | 7/2000 | Wright et al. | 49/339 |
| 6,145,917 | A * | 11/2000 | Ishii et al. | 296/146.1 |
| 6,367,864 | B2 * | 4/2002 | Rogers et al. | 296/146.4 |
| 6,398,288 | B1 * | 6/2002 | Yuge | 296/146.4 |
| 6,557,924 | B2 * | 5/2003 | Lauderbach et al. | 296/146.4 |
| 7,034,485 | B2 * | 4/2006 | Kuan et al. | 318/466 |
| 7,069,695 | B2 * | 7/2006 | Hattori et al. | 49/341 |
| 7,071,644 | B2 * | 7/2006 | Kawanobe | 318/280 |
| 7,121,043 | B2 * | 10/2006 | Yokota | 49/340 |
| 7,547,058 | B2 * | 6/2009 | King et al. | 296/146.8 |
| 7,810,280 | B2 * | 10/2010 | Hattori et al. | 49/340 |
| 7,866,728 | B2 * | 1/2011 | Suzuki | 296/146.4 |
| 8,366,176 | B2 * | 2/2013 | Kaburaki | 296/146.4 |
| 2001/0047625 | A1 * | 12/2001 | Sedlak et al. | 49/341 |
| 2003/0116977 | A1 * | 6/2003 | Erices | 292/201 |
| 2005/0017539 | A1 * | 1/2005 | Ihashi et al. | 296/146.8 |
| 2006/0108959 | A1 * | 5/2006 | Gueler et al. | 318/445 |
| 2008/0296929 | A1 * | 12/2008 | Suzuki et al. | 296/146.9 |
| 2012/0285087 | A1 * | 11/2012 | Eggeling et al. | 49/29 |

FOREIGN PATENT DOCUMENTS

| | | |
|---|---|---|
| WO | 2010046008 | 4/2010 |

* cited by examiner

*Primary Examiner* — Kiran B Patel

(74) *Attorney, Agent, or Firm* — Pauly, Devries Smith & Deffner, L.L.C.

(57) ABSTRACT

A method for operating a hatch arrangement of a motor vehicle is provided. The hatch arrangement has a hatch leaf with a hatch drive associated with the hatch leaf, and a hatch controller, with, amongst other things, a motor-operated closing process triggered by the hatch controller. The hatch arrangement has a motor vehicle lock, it being possible to reverse the hatch leaf starting from an opening and/or closing process in a motor-operated reversing process in a manner triggered by the hatch controller. As part of a reversing process which is initiated starting from a closing process, the motor vehicle lock and possibly the hatch drive is or are actuated, at least in phases as a function of the lock state, in such a way that engagement in a retaining manner between the motor vehicle lock and the lock striker or the like is avoided or released during the reversing operation.

18 Claims, 3 Drawing Sheets

METHOD FOR OPERATING A HATCH ARRANGEMENT OF A MOTOR VEHICLE

CROSS-REFERENCE TO RELATED APPLICATIONS

This application claims the benefit of German Patent Application No. 10 2010 054 975.4, filed Dec. 20, 2010, the disclosure of which is incorporated herein in its entirety.

FIELD OF THE INVENTION

The present invention relates to a method for operating a hatch arrangement of a motor vehicle, to a hatch arrangement of a motor vehicle and also to a hatch controller for the hatch drive of a hatch arrangement.

BACKGROUND OF THE INVENTION

The method under discussion is used in connection with the motor-operated adjustment of a hatch leaf of a motor vehicle. The term "hatch leaf" is to be understood in a broad sense in respect of the said method. Hatch leaves include tailgates, boot lids, engine bonnets, doors, in particular side doors, load-space floors or the like of a motor vehicle.

Hatch arrangements of motor vehicles, which hatch arrangements are equipped with a hatch drive for the motor-operated adjustment of a hatch leaf, are increasingly being used to improve user convenience. Hatch drives of this kind have already become widely accepted for use in single-leaf hatch arrangements (WO 2010/046008 A1). In this case, the hatch drive is generally equipped with a drive controller for implementing a respectively predefined setpoint hatch adjustment operation. The setpoint hatch adjustment operation is prespecified by operation by a user pressing, for example, the open button or close button of a radio key.

The hatch leaf can be adjusted between an open position and a closed position by means of the hatch drive. During a closing process in the closing direction, a motor vehicle lock which is arranged on the hatch leaf engages with a lock striker, which is fixed to the vehicle body, and as a result enters a latching state in which it retains the lock striker for the time being. A lock latch engages in a latching manner with a pawl of the motor vehicle lock in the latching state.

One requirement of the known hatch arrangement from a control aspect is that of preventing the motor vehicle lock and the lock striker engaging in a retaining manner in a way which is not desired. This situation can occur, for example, as a result of the user initiating a reversing process starting from the closing process shortly before the closed position is reached. In the present context, a "reversing process" is to be understood to mean the process with which the movement direction is briefly reversed after the reversing process is initiated.

The initiation of the reversing process is not always followed by an ideally immediate movement reversal since the mass inertia of the hatch leaf and other influences cause the hatch leaf to perform a certain coasting movement in the closing direction. An appreciable coasting movement is to be expected in the case of the known arrangements even when the supply of power to the hatch drive is reversed immediately after the reversing process is initiated.

The fact that a coasting movement of the above kind always occurs in the event of a reversing operation can be problematical in the event of a reversing operation starting from a closing process shortly before the closed position. In this case, the coasting movement can lead, specifically, to the lock striker engaging in a retaining manner with the motor vehicle lock such that the supply of power to the hatch drive in the opening direction counteracts the retaining force of the motor vehicle lock. Even though the user has initiated a reversing process, the hatch leaf remains "stuck" to the lock striker, this being accompanied by a reduction in the operational reliability of the hatch arrangement overall.

SUMMARY OF THE INVENTION

The invention is based on the problem of configuring and developing the known method for operating a hatch arrangement in such a way that the motor-operated reversing operation for the hatch leaf can be carried out in a particularly operationally reliable manner using simple means.

The above problem is solved by controlling the progress of the reversing process with the inclusion of the lock state of the motor vehicle lock in a very specific manner.

Specifically, the motor vehicle lock and possibly the hatch drive are actuated, at least in phases as a function of the lock state, in such a way that engagement in a retaining manner between the motor vehicle lock and the lock striker or the like, this engagement being attributed in particular to an inertia-related coasting movement of the hatch leaf in the closing direction, is avoided or released during the reversing operation.

The "crux" of the invention is therefore that of checking the lock state of the motor vehicle lock to establish whether the motor vehicle lock is in a latching state during the reversing process. If this is the case, this means that there is engagement in a retaining manner between the motor vehicle lock and the lock striker, this however not being desirable during the reversing process under any circumstances. For the sake of completeness, it should be noted that engagement between the motor vehicle lock and the lock striker, which engagement is not "retaining" in the above sense, is not problematical during the reversing process.

Since the situation of undesired engagement in a retaining manner between the motor vehicle lock and the lock striker can occur only in the case of a small opening angle, that is to say when the motor vehicle lock is close to the lock striker, a preferred variant according to claim 4 makes provision for an opening process to be immediately carried out after initiation of the reversing process and the associated power supply switch-off operation if the hatch angle is above a critical opening angle which is yet to be explained.

In one embodiment, an opening power supply operation for the hatch drive is triggered particularly immediately after the power supply switch-off operation, this being accompanied, at least in phases, by a lock state monitoring operation in which a motor-operated lock release process and possibly a power supply switch-off operation are triggered when a latching state is detected. This is advantageous since the opening power supply operation for the hatch drive at the same time makes a contribution to shortening the above coasting movement in the closing direction.

In one embodiment, the reversing process changes into an opening process when an opening movement of the hatch leaf has been detected after the movement reversal. This ensures that there is no undesired engagement in a retaining manner between the lock latch and the lock striker. The same result can be achieved as a result of the reversing process, as explained, turning into the opening process when it is detected that a critical hatch opening angle has been exceeded.

The another embodiment, a variant which is mechanically particularly favourable for the components involved. In this case, the hatch leaf is first brought to a stop and then a check is made to establish whether the motor vehicle lock is in the latching state. An opening power supply operation, which may possibly lead to brief jamming between the motor vehicle lock and the lock striker, is largely precluded in the case of this variant.

In another embodiment, which is likewise assigned independent significance, a hatch arrangement of a motor vehicle is claimed, which hatch arrangement is designed such that the method according to the first-mentioned teaching can be carried out with the hatch arrangement in any case. Reference may be made to all the statements made in relation to the method according to the proposal which are suitable for describing the hatch arrangement.

In line with a further embodiment, which is likewise assigned independent significance, the hatch controller of the above hatch arrangement as such is claimed. Reference may also be made to the statements made in relation to the method according to the proposal in this respect too.

In one embodiment, the invention provides a method for operating a hatch arrangement of a motor vehicle, in which the hatch arrangement has a hatch leaf with a hatch drive which is associated with the hatch leaf, and a hatch controller, with, amongst other things, a motor-operated opening process in the opening direction and a motor-operated closing process in the closing direction being triggered by the hatch controller, in particular as a result of predetermined user actions, with the hatch arrangement having a motor vehicle lock which engages in a retaining manner with a lock striker or the like in a latching state and releases the lock striker or the like in a release state, it being possible to move the motor vehicle lock from the latching state to the release state in a motor-operated release process in a manner triggered by the hatch controller, it being possible to reverse the hatch leaf starting from an opening and/or closing process in a motor-operated reversing process in a manner triggered by the hatch controller, wherein as part of a reversing process which is initiated starting from a closing process, the motor vehicle lock and possibly the hatch drive is or are actuated, at least in phases as a function of the lock state, in such a way that engagement in a retaining manner between the motor vehicle lock and the lock striker or the like, this engagement being attributed in particular to an inertia-related coasting movement of the hatch leaf in the closing direction, is avoided or released during the reversing operation.

In another embodiment, as part of the reversing process, the motor vehicle lock and possibly the hatch drive is/are actuated in such a way that engagement in a retaining manner between the motor vehicle lock and the lock striker or the like is avoided or released during the reversing operation only if a hatch angle which is below a critical opening angle is detected as a function of the lock state.

In another embodiment, the motor vehicle lock has a lock latch and a pawl which is associated with the lock latch, in that the lock latch is in the release state in an open position and is in the latching state in a preliminary latching position or in a main latching position, in that the pawl can be moved to a lowered position in which it retains the lock latch in the preliminary latching position or in the main latching position, and to a raised position in which it releases the lock latch, preferably in that the motor vehicle lock has an opening auxiliary drive which is associated with the pawl, and in that the pawl can be raised by means of the opening auxiliary drive as part of a motor-operated release process.

In another embodiment, a power supply switch-off operation for the hatch drive is first triggered in the reversing process which is initiated starting from the closing process, preferably in that an opening process is carried out starting from the respective hatch position after the power supply switch-off operation in the event of a hatch angle which is above a critical opening angle being detected, possibly after a movement control process is carried out.

In another embodiment, a lock state monitoring operation is triggered after the reversing process is initiated, preferably only if a hatch angle which is below a critical opening angle is detected, a motor-operated lock release process and possibly a power supply switch-off operation being triggered in the said lock state monitoring operation when a latching state is detected.

In another embodiment, an opening power supply operation for the hatch drive is triggered particularly immediately after the power supply switch-off operation, preferably only if a hatch angle which is below a critical opening angle is detected, the said opening power supply operation being accompanied, at least in phases, by a lock state monitoring operation in which a motor-operated lock release process and possibly a power supply switch-off operation are triggered when a latching state is detected.

In one embodiment, an opening power supply operation for the hatch drive is triggered after the lock release process, preferably in that the opening power supply operation is first triggered after the release state of the motor vehicle lock has been detected.

In another embodiment, the lock state monitoring operation is set up and an opening process is carried out starting from the respective hatch position after the opening power supply operation and when an opening movement of the hatch leaf is detected.

In another embodiment, the lock state monitoring operation is set up and an opening process is carried out starting from the respective hatch position when it is detected that a critical opening angle has been exceeded.

In another embodiment, a stationary state monitoring operation for the hatch leaf is triggered after the power supply switch-off operation, preferably only if a hatch angle which is below a critical opening angle is detected, and in that a lock state checking operation is carried out after it is detected that the hatch leaf is stationary, a motor-operated lock release process being triggered in the said lock state checking operation when a latching state is detected.

In another embodiment, an opening power supply operation for the hatch drive is triggered and an opening process is carried out starting from the respective hatch position after the lock state checking operation and possibly after the release state of the motor vehicle lock is detected.

In another embodiment, the invention provides a hatch arrangement of a motor vehicle, with the hatch arrangement having a hatch leaf with a hatch drive which is associated with the hatch leaf, and a hatch controller, it being possible, amongst other things, for a motor-operated opening process to be triggered in the opening direction and for a motor-operated closing process to be triggered in the closing direction by the hatch controller, in particular as a result of predetermined user actions, with a motor vehicle lock being provided which engages in a retaining manner with a lock striker or the like in a latching state and releases the lock striker or the like in a release state, it being possible to move the motor vehicle lock from the latching state to the release state in a motor-operated release process in a manner triggered by the hatch controller, it being possible to reverse the hatch leaf starting from an opening and/or closing process in a reversing process in a manner triggered by the hatch controller, wherein as part of a reversing process which is initiated starting from a closing process, the hatch controller actuates the motor vehicle lock and possibly the hatch drive as a function of the lock state in such a way that engagement in a retaining manner between the motor vehicle lock and the lock striker or the like, this engagement being attributed in particular to an inertia-related coasting movement of the hatch leaf in the closing direction, is avoided or released during the reversing operation.

In another embodiment, the invention provides a hatch controller of a hatch arrangement of a motor vehicle, with the hatch arrangement having a hatch leaf and a hatch drive which is associated with the hatch leaf, it being possible, amongst other things, for a motor-operated opening process to be triggered in the opening direction and for a motor-operated closing process to be triggered in the closing direction by the hatch controller, as a result of predetermined user actions, with a motor vehicle lock being provided which engages in a retaining manner with a lock striker or the like in a latching state and releases the lock striker or the like in a release state, it being possible to reverse the hatch leaf starting from an opening and/or closing process in a reversing process in a manner triggered by the hatch controller, in particular for carrying out a method according to one of the preceding claims, wherein as part of a reversing process which is initiated starting from a closing process, the hatch controller actuates the motor vehicle lock and possibly the hatch drive as a function of the lock state, in such a way that engagement in a retaining manner between the motor vehicle lock and the lock striker or the like, this engagement being attributed in particular to an inertia-related coasting movement of the hatch leaf in the closing direction, is avoided or released during the reversing operation.

BRIEF DESCRIPTION OF THE DRAWINGS

The invention will be explained in greater detail below with reference to a drawing which illustrates only one exemplary embodiment and in which.

DETAILED DESCRIPTION

Figure 1:
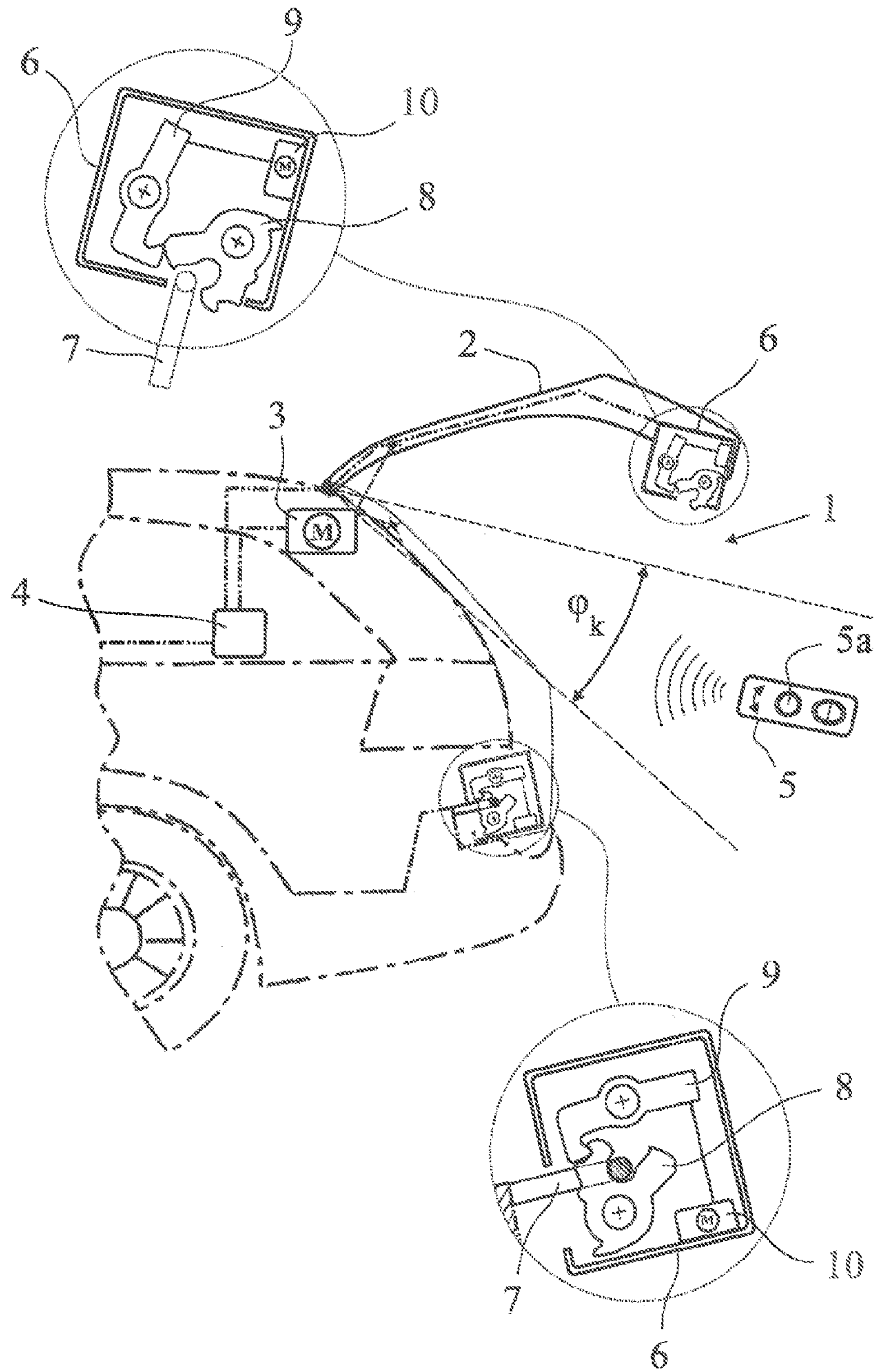
FIG. 1 shows the rear region of a motor vehicle having a hatch arrangement according to the proposal.

The hatch arrangement 1 (illustrated in the drawing) of a motor vehicle is usually equipped with a hatch leaf 2 and a hatch drive 3 which is associated with the hatch leaf 2. A hatch controller 4 is also provided, amongst other things for the purpose of actuating the hatch drive 3. All of these components are illustrated in a highly schematic manner in the drawing.

In this case and preferably, the hatch leaf 2 is the tailgate of a motor vehicle. However, as indicated above, the term "hatch leaf" is broad and covers, amongst other things, boot lids, engine bonnets, doors, in particular side doors, load-space floors or the like of a motor vehicle.

The hatch drive 3 can be designed as an individual drive or have two separate drives which preferably operate in synchronism. In a particularly preferred refinement, double drives of this kind are spindle drives which act on both sides of the hatch opening firstly on the motor vehicle body and secondly on the hatch leaf 2. Reference may be made to WO 2010/046008 A1, which was cited in the introductory part, for an explanation of a structural design of this kind, said document being filed by the same applicant and the content of said document in this respect being incorporated in the subject matter of the present application.

The drawing shows a hatch arrangement 1 having just one single hatch leaf 2. Arrangements 1 with two hatch leaves 2 are increasingly being used particularly in the field of SUVs (Sport Utility Vehicles). The solution according to the proposal likewise covers an arrangement of this kind.

Numerous structural variants are feasible for the hatch controller 4. In this case and preferably, the hatch controller 4 is coupled to a superordinate controller. However, it is also feasible for the hatch controller 4 to be a constituent part of the superordinate controller. Finally, the hatch controller 4 can also be provided decentrally in the individual components which are to be actuated.

The term "hatch controller" also includes all components which serve to detect states by control technology. These include, for example, position sensors which serve to detect the position and/or movement of the hatch leaf 2. Position sensors of this kind are generally accommodated in the hatch drive 3 itself and are designed, for example, as Hall or magnetoresistive (MR) sensors.

Motor-operated adjustment processes, for example a motor-operated opening process in the opening direction and a motor-operated closing process in the closing direction, can be triggered by the hatch controller 4 as a result of predetermined user actions such as operation of a radio key 5 (only schematically illustrated). A preferred variant for an operator control concept in this respect will be explained further below.

In order to be able to keep the hatch leaf 2 in the closed position (indicated using dashed lines in FIG. 1), the hatch arrangement 1 is equipped with a motor vehicle lock 6 which can be moved to different lock states.

The motor vehicle lock 6 engages in a retaining manner with a lock striker 7 or the like in the latching state, which can be a preliminary latching state or a main latching state. The latching state is established automatically, specifically in a latching manner, during the closing process when the lock striker 7 enters the motor vehicle lock 6. The motor vehicle lock 6 releases the lock striker 7 or the like in a release state. Before an opening process starting from the closed position is carried out, a motor-operated release process in which the motor vehicle lock 2 is moved from the latching state to the release state by motor operation is carried out in a manner triggered by the hatch controller 4. Structural details relating to the motor vehicle lock 6 will be specified further below.

Reversing the hatch leaf 2 starting from a motor-operated movement process is of primary importance in the present case. Accordingly, provision is made for the hatch leaf 2 to be able to be reversed starting from an opening and/or closing process in a motor-operated reversing process in a manner triggered by the hatch controller 4. The progress of a reversing process of this kind can be seen in FIGS. 2*a*, 2*b*, 3*a*, 3*b*.

Figure 2:
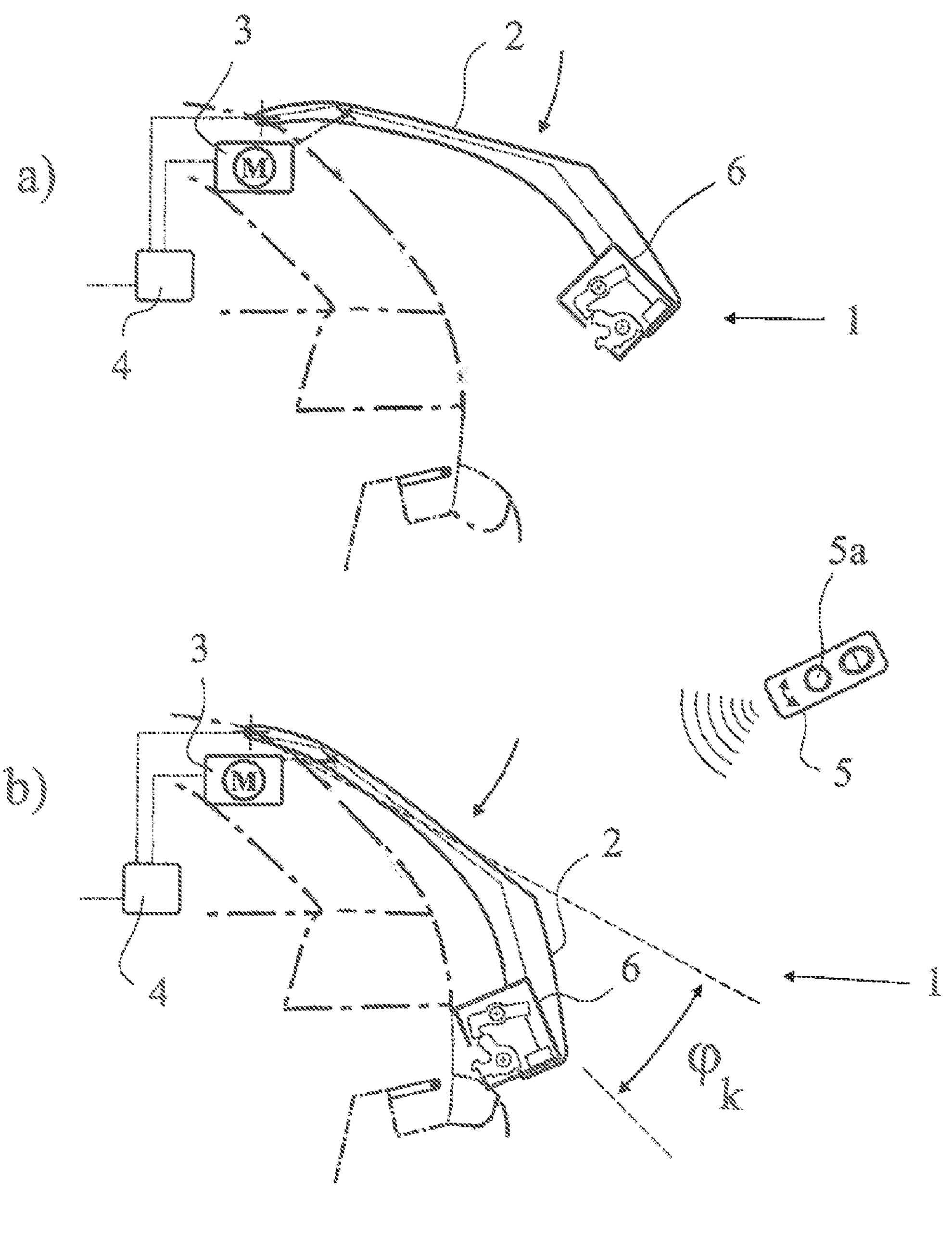
FIG. 2 shows the rear region of the motor vehicle according to FIG. 1 during a motor-operated closing process a) after approximately half an adjusting movement and b) shortly before the closed position when a reversing process is initiated.
Figure 3:
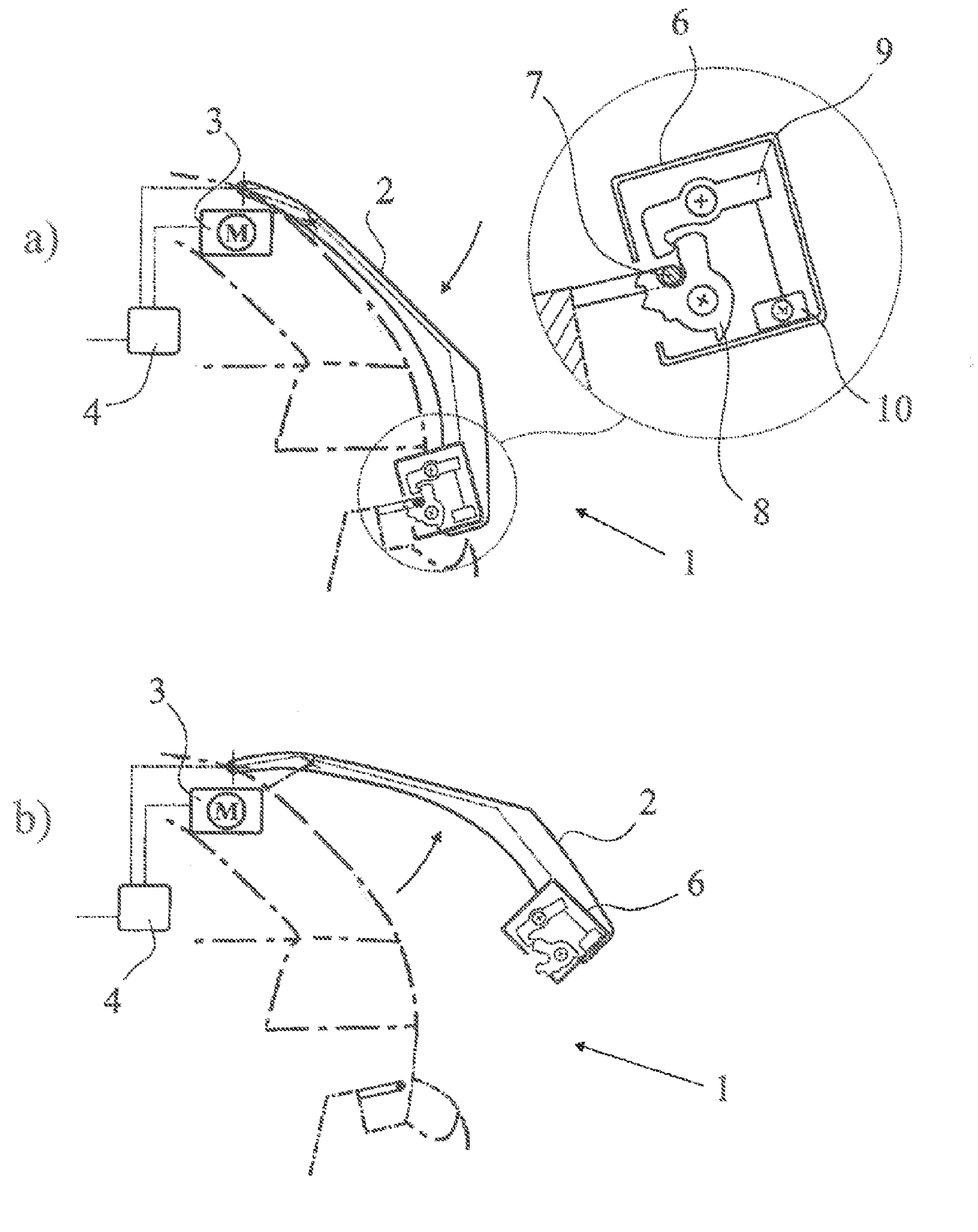
FIG. 3 shows the continuation of the reversing process which was initiated in FIG. 2*b* a) with engagement in a retaining manner between the motor vehicle lock and the lock striker which is undesired per se and b) after the transition of the reversing process into a motor-operated opening process.

FIG. 2*a* shows a situation in which approximately half of a motor-operated closing process has been carried out. The user initiates a reversing process as a result of a corresponding user action, in this case as a result of operating a radio key 5, shortly before the closed position is reached (FIG. 2*b*). In spite of the reversing process being initiated, the hatch leaf 2 continues to move in the closing direction to a certain extent (coasting movement), in particular on account of its mass inertia, this leading, according to FIG. 3*a*, to the motor vehicle lock 6 entering a preliminary latching state and therefore engaging in a retaining manner with the lock striker 7 or the like.

In order to prevent the hatch drive 3 counteracting the engagement in a retaining manner between the motor vehicle lock 6 and the lock striker 7 or the like during the reversing process, provision is made, according to the proposal, for the motor vehicle lock 6 and in this case the hatch drive 3 too to be actuated, at least in phases as a function of the lock state, in such a way that engagement in a retaining manner between the motor vehicle lock 6 and the lock striker or the like, this engagement being attributed in particular to the inertia-related coasting movement of the hatch leaf 2 in the closing direction, is avoided or released during the reversing operation. This can be realized in a whole variety of variants, as will be explained later.

The term "in phases" means, for example, that, in one variant, this actuation, which is dependent on the lock state, takes place when the hatch angle is below a critical opening angle $\phi_k$. However, the actuation according to the proposal can, in principle, also be provided over the entire adjustment path of the hatch leaf 2.

When the hatch leaf 2 is specifically not in the vicinity of the closed position, there is no risk of the undesired engagement in a retaining manner between the motor vehicle lock 6 and the lock striker 7 or the like. In this case, the actuation which is provided as a function of the lock state can be virtually deactivated. Correct selection of the critical opening angle $\phi_k$ is very particularly important in this case. The critical opening angle $\phi_k$ is illustrated in FIG. 1 for illustration purposes.

The critical opening angle $\phi_k$ defines the opening region of the hatch leaf 2 with which the risk of undesired engagement in a retaining manner between the motor vehicle lock 6 and the lock striker 7 or the like is associated, if a reversing process starting from a closing process is initiated there.

A whole range of environmental conditions have to be taken into consideration when determining the critical opening angle $\phi_k$, these environmental conditions leading, under certain circumstances, to the need to increase the $\phi_k$. Environmental conditions of this kind are, for example, a situation of the motor vehicle being on a slope, loading of the hatch leaf 2, for example by snow or the like, a switched-off fan which reduces the counterpressure against the hatch leaf 2 during the closing process, different temperature conditions which cause variations in the seal counterpressure, and the opening of one or more motor vehicle doors, which, in turn, lead to a reduction in the counterpressure against the hatch leaf 2 during the closing process. Accordingly, the critical opening angle $\phi_k$ can be readily determined in practical experiments.

Against the above background, it is also feasible for the critical opening angle $\phi_k$ to be variable. An example of this would be the increase in the critical opening angle $\phi_k$ when an inclination sensor detects that the motor vehicle is on a slope. Numerous adaptation strategies are possible here.

The solution according to the proposal can be implemented with all the possible structural variants of motor vehicle locks. In this case and preferably, the motor vehicle lock 6 has a lock latch 8 and a pawl 9 which is associated with the lock latch 8, with the lock latch 8 being in an open position (illustration of a detail at the top of FIG. 1) in the release state, and in a preliminary latching position (illustration of a detail in FIG. 3*a*) or in a main latching position (illustration of a detail at the bottom of FIG. 1) in the latching state. The pawl 9 can be moved to a lowered position (illustration at the bottom of FIG. 1) in which it retains the lock latch 8 in the preliminary latching position or in the main latching position. Furthermore, the pawl 9 can be moved to a raised position (illustration of a detail at the top of FIG. 1) in which it releases the lock latch 8.

In order to be able to implement a motor-operated release process as discussed above, the motor vehicle lock 6 is equipped with an opening auxiliary drive 10 by means of which the pawl 9 can be raised by motor. The motor-operated release process plays a particularly important role in the present case.

The reversing process can be initiated by the user in an entirely different way depending on the operator control concept.

One operator control variant is that of the on-going adjustment process being stopped during a motor-operated adjustment process by a button 5*a*, in particular of a radio key 5, being pressed, and an adjustment process in the opposite direction being triggered when the button 5*a* is pressed again (toggle principle). Therefore, the button has to be pressed twice in order to initiate a reversing process.

A power supply switch-off operation of the hatch drive 3 is preferably first triggered in the reversing process which is initiated starting from the closing process, in order to then carry out an opening power supply operation for the hatch drive 3 for opening purposes, possibly with further steps being incorporated.

If the hatch controller 4 has detected that the hatch angle is above the critical opening angle $\phi_k$, an opening process in line with normal operation starting from the respective hatch position can, in principle, be carried out. In a preferred refinement, a movement control process can be further incorporated here, this movement control process ensuring, for example, gentle braking in the closing direction.

A lock state monitoring operation is preferably triggered after the reversing process is initiated, the said lock state monitoring operation further preferably being triggered only if a hatch angle which is below the critical opening angle $\phi_k$ is detected. State data is preferably provided in the motor vehicle lock 6 for monitoring the lock state, the said state data further preferably being interrogated by the hatch controller 4.

In the lock state monitoring operation, a motor-operated lock release process is triggered when a latching state is detected, that is to say when the engagement in a retaining manner between the motor vehicle lock 6 and the lock striker 7 is detected. In addition, a power supply switch-off operation is preferably also triggered in this case and preferably, in order to prevent any possible mechanical damage.

In a particularly preferred refinement, provision is made for an opening power supply operation for the hatch drive 3 to be triggered particularly immediately after the power supply switch-off operation, the said opening power supply operation being accompanied, at least in phases, by a lock state monitoring operation in which a motor-operated lock release process and here a power supply switch-off operation are again triggered when a latching state is detected. Once again, this is preferably done only if a hatch angle which is below the critical opening angle $\phi_k$ is detected. An opening power supply operation of the hatch drive 3 is again triggered after the lock release process, but this is preferably done only after the release state of the motor vehicle lock 6 has been detected.

In the normal case, the hatch leaf 2 should then move in the opening direction and pass through the critical opening angle $\phi_k$. Accordingly, the lock state monitoring operation is preferably established after the opening power supply operation if an opening movement of the hatch leaf 2 has been detected. Another variant makes provision for the lock state monitoring operation to be established only when it is detected that the critical opening angle has been exceeded. In both cases, an opening process is then carried out starting from the respective hatch position, the said opening process generally ending with the hatch drive 3 being automatically switched off when the open position is reached.

In another preferred variant, a stationary state monitoring operation for the hatch leaf 2 is first provided after the power supply switch-off operation, with a lock state checking operation being carried out only after the stationary state of the hatch leaf 2 is detected. In the lock state checking operation, a motor-operated lock release process is triggered again when a latching state is detected. In this case too, the stationary state monitoring operation is triggered only if it is detected that the hatch angle is below the critical opening angle $\phi_k$.

In respect of the stationary state monitoring operation, it should be noted that detection of the stationary state does not necessarily require an "ideal stationary state". Provision can be made, in principle, for a stationary state to be detected when the hatch speed is below a predetermined lower threshold.

Finally, an opening power supply operation of the hatch drive 3 is triggered and an opening process in line with normal operation is carried out starting from the respective hatch position after the lock state checking operation and, in this case, after the release state of the motor vehicle lock 6 is detected.

The above statements show that mechanical jamming which is caused by undesired engagement in a retaining manner between the motor vehicle lock 6 and the lock striker 7 can be largely precluded by virtue of the method according to the proposal.

According to two further teachings which each, on their own, are assigned independent significance, a hatch arrangement 1 as such and a hatch controller 4 as such are claimed, said hatch arrangement and hatch controller being designed in order to carry out the method according to the first-mentioned teaching. Reference may be made to the above statements for explanation and in respect of possible variants in this case too.

In conclusion, it should also be noted that the hatch arrangement 1 generally has, in addition to a hatch drive 3, a closing auxiliary device having a closing auxiliary drive. The closing auxiliary device is associated with the motor vehicle lock 6 and takes over the task of pulling closed the hatch leaf 2 in the last stage of the closing process. A closing auxiliary device of this kind is required in most cases since the counterpressures which occur in the last stage of the closing process, in particular seal counterpressures, can only seldom be applied by the hatch drive 3.

For the solutions in line with the proposal, this means that triggering of a closing auxiliary process has to be avoided during the reversing process. To this end, provision is made in line with the proposal for the closing auxiliary device, in particular the closing auxiliary drive, to be switched off during the reversing process.

What is claimed is:

1. A method for operating a hatch arrangement of a motor vehicle, the method comprising:

operating the hatch arrangement to open or close the a motor vehicle hatch, with the hatch arrangement having a hatch leaf with a hatch drive which is associated with the hatch leaf, and a hatch controller, the method of operating the hatch including a motor-operated opening process in the opening direction and a motor-operated closing process in the closing direction triggered by the hatch controller as a result of predetermined user actions, wherein the hatch arrangement has a motor vehicle lock which engages in a retaining manner with a lock striker in a latching state and releases the lock striker in a release state, wherein it is possible to move the motor vehicle lock from the latching state to the release state in a motor-operated release process in a manner triggered by the hatch controller, and it being possible to reverse the hatch leaf starting from an opening and/or closing process in a motor-operated reversing process in a manner triggered by the hatch controller, wherein as part of a reversing process which is initiated starting from a closing process, the motor vehicle lock is actuated, at least in phases as a function of the lock state, wherein engagement in a retaining manner between the motor vehicle lock and the lock striker attributed to an inertia-related coasting movement of the hatch leaf in the closing direction, is avoided or released during the reversing operation.

2. The method according to claim 1, wherein the hatch drive is actuated such that engagement in a retaining manner between the motor vehicle lock and the lock striker attributed to an inertia-related coasting movement of the hatch leaf in the closing direction is avoided or released during the reversing operation.

3. The method according to claim 1, wherein as part of the reversing process, the motor vehicle lock or the motor vehicle lock and the hatch drive is/are actuated in such a way that engagement in a retaining manner between the motor vehicle lock and the lock striker is avoided or released during the reversing operation only if a hatch angle which is below a critical opening angle is detected as a function of the lock state.

4. The method according to claim 1, wherein the motor vehicle lock has a lock latch and a pawl associated with the lock latch, wherein the lock latch is in the release state in an open position and is in the latching state in a preliminary latching position or in a main latching position, wherein the pawl can be moved to a lowered position in which it retains the lock latch in the preliminary latching position or in the main latching position, and to a raised position in which it releases the lock latch.

5. The method according to claim 4, wherein the motor vehicle lock has an opening auxiliary drive which is associated with the pawl, and the pawl can be raised by means of the opening auxiliary drive as part of a motor-operated release process.

6. The method according to claim 1, wherein a power supply switch-off operation for the hatch drive is first triggered in the reversing process which is initiated starting from the closing process.

7. The method according to claim 6, wherein an opening process is carried out starting from the respective hatch position after the power supply switch-off operation in the event of a hatch angle which is above a critical opening angle being detected.

8. The method according to claim 1, wherein a lock state monitoring operation is triggered after the reversing process is initiated.

9. The method according to claim 8, wherein the lock state monitoring operation is triggered only if a hatch angle which is below a critical opening angle is detected, wherein a motor-operated lock release process and a power supply switch-off operation is triggered in the lock state monitoring operation when a latching state is detected.

10. The method according to claim 1, wherein an opening power supply operation for the hatch drive is triggered immediately after the power supply switch-off operation.

11. The method according to claim 10, wherein the opening power supply operation for the hatch drive is triggered only if a hatch angle which is below a critical opening angle is detected, the opening power supply operation being accompanied, at least in phases, by a lock state monitoring operation in which a motor-operated lock release process and a power supply switch-off operation are triggered when a latching state is detected.

12. The method according to claim 11, wherein an opening power supply operation for the hatch drive is triggered after the lock release process.

13. The method according to claim 12, wherein the opening power supply operation is first triggered after the release state of the motor vehicle lock has been detected.

14. The method according to claim 12, wherein the lock state monitoring operation is set up and an opening process is carried out starting from the respective hatch position after the opening power supply operation and when an opening movement of the hatch leaf is detected.

15. The method according to claim 12, wherein the lock state monitoring operation is set up and an opening process is carried out starting from the respective hatch position when it is detected that a critical opening angle has been exceeded.

16. The method according to claim 12, wherein a stationary state monitoring operation for the hatch leaf is triggered after the power supply switch-off operation.

17. The method according to claim 16, wherein the stationary state monitoring operation for the hatch leaf is triggered only if a hatch angle which is below a critical opening angle is detected, and wherein a lock state checking operation is carried out after it is detected that the hatch leaf is stationary, a motor-operated lock release process being triggered in the lock state checking operation when a latching state is detected.

18. The method according to claim 17, wherein an opening power supply operation for the hatch drive is triggered and an opening process is carried out starting from the respective hatch position after the lock state checking operation and after the release state of the motor vehicle lock is detected.

* * * * *

UNITED STATES PATENT AND TRADEMARK OFFICE

CERTIFICATE OF CORRECTION

PATENT NO. : 8,534,743 B2
APPLICATION NO. : 13/331674
DATED : September 17, 2013
INVENTOR(S) : Alexander Scheler It is certified that error appears in the above-identified patent and that said Letters Patent is hereby corrected as shown below:

IN THE CLAIMS:

At column 9, at lines 62 - 63, please change:

"operating the hatch arrangement to open or close the a motor vehicle hatch, with the hatch arrangement having"

to:

--operating the hatch arrangement to open or close a motor vehicle hatch, with the hatch arrangement having--

Signed and Sealed this
Thirty-first Day of December, 2013

Margaret A. Focarino

Margaret A. Focarino
*Commissioner for Patents of the United States Patent and Trademark Office*